(12) United States Patent
Wang et al.

(10) Patent No.: US 11,383,235 B2
(45) Date of Patent: Jul. 12, 2022

(54) DEVICE AND METHOD FOR MICROSCALE CHEMICAL REACTIONS

(71) Applicant: THE REGENTS OF THE UNIVERSITY OF CALIFORNIA, Oakland, CA (US)

(72) Inventors: Jia Wang, Los Angeles, CA (US); R. Michael Van Dam, Sherman Oaks, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 339 days.

(21) Appl. No.: 16/339,344

(22) PCT Filed: Oct. 6, 2017

(86) PCT No.: PCT/US2017/055585
§ 371 (c)(1),
(2) Date: Apr. 3, 2019

(87) PCT Pub. No.: WO2018/067965
PCT Pub. Date: Apr. 12, 2018

(65) Prior Publication Data
US 2020/0179927 A1 Jun. 11, 2020

Related U.S. Application Data

(60) Provisional application No. 62/405,758, filed on Oct. 7, 2016.

(51) Int. Cl.
*B01L 9/00* (2006.01)
*B01L 3/00* (2006.01)
(Continued)

(52) U.S. Cl.
CPC ..... *B01L 3/502707* (2013.01); *B01J 19/0093* (2013.01); *B01L 3/502715* (2013.01);
(Continued)

(58) Field of Classification Search
CPC ......... B01L 2200/16; B01L 2300/1805; B01L 2300/1822; B01F 13/0084
(Continued)

(56) References Cited

U.S. PATENT DOCUMENTS 6,485,690 B1 * 11/2002 Pfost .................... B01J 19/0046
422/552
2006/0228258 A1 * 10/2006 Samsoondar .......... G01N 21/03
422/82.05
(Continued)

FOREIGN PATENT DOCUMENTS

WO 2016/112090 A1 7/2016

OTHER PUBLICATIONS

PCT International Preliminary Report on Patentability (Chapter I of the Patent Cooperation Treaty) for PCT/US2017/055585, Applicant: The Regents of the University of California, Form PCT/IB/326 and 373, dated Apr. 18, 2019 (9pages).
(Continued)

*Primary Examiner* — Natalia Levkovich
(74) *Attorney, Agent, or Firm* — Vista IP Law Group LLP

(57) ABSTRACT

A microfluidic synthesis platform includes a microfluidic chip holder that has a computer controlled heating element and cooling element therein. A microfluidic chip is mountable in the microfluidic chip holder. The microfluidic chip is formed by a hydrophobic substrate having patterned thereon a hydrophilic reaction site and a plurality of hydrophilic channels or pathways extending outward from the hydrophilic reaction site and terminating at respective loading sites on the substrate, wherein the hydrophilic channels or
(Continued)

pathways are tapered with an increasing width in an inward direction toward the hydrophilic reaction site. A fixture is provided for holding a plurality of non-contact reagent dispensing devices above the microfluidic chip at locations corresponding to the loading sites of the plurality of hydrophilic channels or pathways, the fixture further holding a moveable collection tube disposed above the hydrophilic reaction site of the microfluidic chip for removing droplets containing reaction products.

11 Claims, 8 Drawing Sheets

(51) Int. Cl.
*B01J 19/00* (2006.01)
*B01L 7/00* (2006.01)

(52) U.S. Cl.
CPC .......... *B01L 3/502784* (2013.01); *B01L 7/52* (2013.01); *B01J 2219/0072* (2013.01); *B01J 2219/00495* (2013.01); *B01J 2219/00873* (2013.01); *B01J 2219/00993* (2013.01); *B01L 2200/16* (2013.01); *B01L 2300/12* (2013.01); *B01L 2300/165* (2013.01); *B01L 2300/1805* (2013.01)

(58) Field of Classification Search
USPC ................................................ 422/503, 564
See application file for complete search history.

(56) References Cited

U.S. PATENT DOCUMENTS

| | | |
|---|---|---|
| 2008/0233018 A1 | 9/2008 | van Dam et al. |
| 2009/0036668 A1 | 2/2009 | Elizarov et al. |
| 2009/0095635 A1 | 4/2009 | Elizarov et al. |
| 2011/0097245 A1 | 4/2011 | Elizarov et al. |
| 2011/0150714 A1 | 6/2011 | Elizarov et al. |
| 2012/0101268 A1 | 4/2012 | Elizarov et al. |
| 2012/0107175 A1 | 5/2012 | Satyamurthy et al. |
| 2012/0264932 A1 | 10/2012 | Van Dam et al. |
| 2013/0090248 A1 | 4/2013 | Link et al. |
| 2013/0287647 A1 | 10/2013 | Corso et al. |
| 2015/0072374 A1 | 3/2015 | Ng et al. |
| 2015/0147777 A1 | 5/2015 | Dothie |
| 2015/0148549 A1 | 5/2015 | Van Dam et al. |
| 2015/0203416 A1 | 7/2015 | Van Dam et al. |
| 2015/0329583 A1 | 11/2015 | Satyamurthy et al. |
| 2016/0107951 A1 | 4/2016 | Van Dam et al. |
| 2016/0130295 A1 | 5/2016 | Satyamurthy et al. |
| 2016/0209431 A1 | 7/2016 | Battrell et al. |
| 2016/0280734 A1 | 9/2016 | Moore et al. |
| 2017/0102391 A1 | 4/2017 | Van Dam et al. |

OTHER PUBLICATIONS

PCT International Search Report for PCT/US2017/055585, Applicant: The Regents of the University of California, Form PCT/ISA/210 and 220, dated Dec. 28, 2017 (3pages).
PCT Written Opinion of the International Search Authority for PCT/US2017/055585, Applicant: The Regents of the University of California, Form PCT/ISA/237, dated Dec. 28, 2017 (7pages).
Chen, Supin et al., Radiolabelling diverse positron emission tomography (PET) tracers using a single digital microfluidic reactor chip, Lab Chip, 2014, 14, 902-910.
Hong, Jiwoo et al., Drop transport between two non-parallel plates via AC electrowetting-driven oscillation, Sensors and Actuators B 188 (2013) 637-643.
King, Siyuan et al., Droplet-driven transports on superhydrophobic-patterned surface microfluidics, Lab Chips, 2011, 11, 3642-3648.
Yeh, Szu-I et al., Droplets coalescence and mixing with identical and distinct surface tension on a wettability gradient surface, Microfluidic Nanofluid (2013) 14:785-795.
Ghosh, Aritra et al., Wettability patterning for high-rate, pumpless fluid transport on open, non-planar microfluidic platform, DOI: 10.1039/c1c51406d.
Javed, Muhammad Rashed et al., High yield and high specific activity synthesis of [18F]fallypride in a batch microfluidic reactor for micro-PET imaging, Chem. Commun. 2014, 50, 1192.
Keng, Pei Yuin et al., Digital Microfluidics: A New Paradigm for Radiochemistry, Molecular Imaging, vol. 14 (Dec. 2015): pp. 579-594.
Keng, Pei Yuin et al., Chapter 7 Advantages of Radiochemistry in Microliter Volumes, 2016, DOI 10.1007/978-4-431-55894-1_7.
Lu, S.Y. et al., 10 Micro-reactors for PET Tracer Labeling, date: unknown (17pages).
Alheshibiri, M.H. et al., Spontaneous movement of water droplets on patterned Cu and Al surfaces with wedge-shaped gradients, Applied Physics Letters 102, 174103 (2013).
Wang, J. et al., Performing multi-step chemical reactions in microliter-sized droplets by leveraging a simple passive transport mechanism, Lab Chip, 2017, 17, 4342.
Ghosh, A. et al., Wettability patterning for high-rate pumpless fluid transport on open, non-planar microfluidic platforms, Lab Chip, 2014, 14, 1538.
Gleichmann, T. et al., Smart Open Microfluidics: An Automated Platform for the Dynamic Generation of Fluidic Structures Down to the Sub-nL-Range, 2nd International Conference on Microfluidic Handling Systems (MFHS 2014; Oct. 8-10, 2014).
The extended European search report dated Sep. 16, 2019 in European Patent Application No. 17859271.3, (15 pages).
Communication pursuant to Rules 70(2) and 70a(2) EPC dated Oct. 4, 2019 in European Application No. 17859271.3, (1 page).
Response to extended European search report dated Apr. 8, 2020 in European Patent Application No. 17859271.3, (60 pages).

\* cited by examiner

DEVICE AND METHOD FOR MICROSCALE CHEMICAL REACTIONS

RELATED APPLICATION

This Application is a U.S. National Stage filing under 35 U.S.C. § 371 of International Application No. PCT/US2017/055585, filed Oct. 6, 2017, which claims priority to U.S. Provisional Patent Application No. 62/405,758 filed on Oct. 7, 2016, which are hereby incorporated by reference. Priority is claimed pursuant to 35 U.S.C. §§ 119, 371 and any other applicable statute.

STATEMENT REGARDING FEDERALLY SPONSORED RESEARCH AND DEVELOPMENT

This invention was made with government support under Grant Nos. AG049918, MH097271, CA016042, and CA212718, awarded by the National Institutes of Health. The government has certain rights in the invention.

TECHNICAL FIELD

The technical field generally relates to devices and methods used microscale chemical reactions. More specifically, the technical field generally relates to miniaturized or microfluidic platforms for performing chemical reactions and in particular radiochemical reactions.

BACKGROUND

Despite the increasing importance of positron emission tomography (PET) imaging in biological and clinical research, access to myriad new radioactive tracers is limited. This is in part due to the short half-life, which requires daily production close to the site of use, and also due to the high complexity of tracer production, which requires costly equipment operated behind radiation shielding and other safety infrastructure. Miniaturization of the equipment via digital microfluidic radiosynthesizer technology reduces the cost of the automated synthesizer, radiation shielding and reagents. This could enable a move away from the centralized production model, where cost is reduced by making large batches of a small number of tracers such that the costs of each can be spread over many end users. By instead making it affordable to make smaller batches of tracers, microscale tracer production could be practiced directly by the end user, increasing access to diverse tracers.

Microfluidics have been widely used in radiochemical filed. Many investigators have been working on microfluidic radiosynthesizers based on flow-through (or "continuous flow") microfluidics, where reactions occur by flowing reagent streams through mixers and capillary tubes or other structures. Flow-through synthesizers have been commercialized (e.g., Advion Biosciences). The flow-through based radiosynthesizer can significantly reduce the precursor concentration needed for reactions compared to macroscale radiosynthesizer, and can sometimes improve reaction speed or yield. However, the size of the synthesizer is still very large (comparable in size to traditional macroscale systems), thus not providing any advantages in terms of instrument cost, shielding cost, or lab real estate used. Furthermore, since evaporation steps cannot be performed in microchannels or capillaries of flow-through systems, these reactors must be coupled with bulky conventional apparatus to perform these steps.

The electro-wetting on dielectric (EWOD) platform addresses some of these shortcomings. All steps of radiochemical reactions can be performed on the same EWOD chip, including evaporation, mixing and reactions, and only tiny volumes of reagents are needed. The electrowetting on-dielectric (EWOD) microfluidic platform has been used to efficiently synthesize several tracers in a compact form factor. Furthermore, the tracers are produced with minimal reagent consumption and have very high "specific activity." See Chen et al., Radiolabelling Diverse Positron Emission Tomography (PET) Tracers Using a Single Digital Microfluidic Reactor Chip," Lab on a Chip, Vol. 14, pp. 902-910 (2014). Nonetheless, the wide spread adoption of the EWOD platform is limited by the high cost for the EWOD chip and its complicated operation. EWOD chips are fabricated from several layers, including an electrode layer (e.g., indium-tin-oxide or ITO, gold, or other metals) for droplet actuation electrodes and for connections to the external control system, a dielectric layer to prevent current flow through the reaction droplet, and a hydrophobic layer. The large number of processing steps makes the EWOD chips expensive and the relatively large surface area (e.g., ~25 mm square) makes it challenging to produce the pinhole-free dielectric layers that are essential to avoid dielectric breakdown and electrolysis of droplets on the chip.

Other investigators have looked at passive droplet manipulation that do not require electrodes or other means of actuation. The majority of reported methods for passive droplet manipulation are driven by gradients in geometry or surface tension. For example, Yeh et al. described a method to generate a gradient in the density of hydrophobic decyltrichlorosilane (DTS) molecules on the substrate. This chemical gradient on the surface leads to an imbalance in surface tension and resulting in a net force on the droplet toward the more hydrophilic side (i.e., lower DTS density). See Yeh S I et al., Droplets coalescence and mixing with identical and distinct surface tension on a wettability gradient surface, Microfluidics and Nanofluidics, 14:785-795 (2013). Ng et al. reported a method to manipulate droplets using Marangoni force. An ethanol droplet is used to create a surface tension gradient in an adjacent water droplet via evaporation of ethanol that then mixes into this second droplet. The ethanol concentration is highest on the surface of the water droplet closest to the ethanol droplet and lowest on the opposite side of the water droplet. The difference in surface tension drives the water droplet move to the opposite direction where the ethanol droplet is positioned on the hydrophilic track. See Vi-Vie Ng et al., Marangoni-induced actuation of miscible liquid droplets on an incline, In International Journal of Multiphase Flow, V. 82, pp. 27-34 (2016). Hong et al. studied the droplet transportation between two non-parallel electrode plates via AC electrowetting. The surface tension difference caused by non-parallel plates works together with interfacial oscillation driven by AC electrowetting and pulls the droplet to move toward narrow side. See J. Hong et al., Drop transport between two non-parallel plates via AC electrowetting-driven oscillation, Sens. Actuators B Chem., 188, pp. 637-643 (2013). Xing et al. reported that droplets can also be passively manipulated through capillary micropumping. A droplet of smaller volume is pumped along a superhydrophilic pathway on a hydrophobic surface to the side where a larger liquid droplet is located by a pressure difference across the droplet interface. See S. Xing et al., Droplet-driven transports on superhydrophobic-patterned surface microfluidics, *Lab. Chip*, 11, pp. 3642-3648 (2011).

While these techniques provide a wide range of possible transport mechanisms, not all would be suitable for performing multi-step chemical reactions. The presence of solvents or surface molecules used to provide chemical gradients could potentially interfere with, or be affected by, the intended chemical reactions on the chip. Although fabrication processes are simple in some cases, approaches such as gradient of DTS density and gradient of height do not appear to lend themselves to the creation of sophisticated channel networks.

SUMMARY

In one embodiment, a passive microfluidic chip is provided that includes a patterned surface based on "patterned wettability," whereby droplets are passively manipulated, thus eliminating the need for two of the three functional layers of the EWOD chip (i.e., the electrode and dielectric layers). The passive microfluidic chip operates on passive transport, whereby droplets travel along tapered hydrophilic channels or pathways (e.g., tracks) that are formed on a hydrophobic substrate. When a droplet is placed on a tapered hydrophilic channel or pathway, the contact line at the wide end of the taper is longer and has a higher total force than the contact line at the rear of the droplet. This force imbalance naturally drives droplets toward the wide end of the hydrophilic channel or pathway. In the microfluidic chip described herein, a plurality of such tapered tracks are located on the microfluidic chip and lead to a common or central region on the microfluidic chip that is used as a reaction site. For example, the microfluidic chip includes a central reaction site with a plurality of tapered tracks that radiate outward from the central reaction site. With such ability, combined with an optional temperature control mechanism, it is possible to perform all of the unit operations needed for multistep radiochemical reactions, including the movement of reagents from fixed dispensers to a central reaction site, performing evaporations, and performing reactions.

In one embodiment, a passive microfluidic device includes a hydrophobic substrate having patterned thereon a hydrophilic reaction site and a plurality of hydrophilic channels or pathways extending outward from the hydrophilic reaction site. One or more of the hydrophilic channels or pathways may terminate at respective loading sites on the substrate. The hydrophilic channels or pathways are tapered with an increasing width in an inward direction from the loading sites to the hydrophilic reaction site.

In another embodiment, a passive microfluidic device includes a hydrophobic substrate having patterned thereon a hydrophilic reaction site and one or more hydrophilic channels or pathways extending outward from the hydrophilic reaction site on the substrate, wherein the one or more hydrophilic channels or pathways are tapered along a length thereof and have a taper angle of at least 4°. The one or more hydrophilic channels or pathways may be straight or curved. In some embodiments, the one or more hydrophilic channels or pathways terminate at loading sites where droplets may be loaded. In other embodiments, the one or more hydrophilic channels or pathways terminate at a junction or the like whereby multiple droplets can be combined or mixed into a single droplet that can then traverse the hydrophilic channel or pathway to the hydrophilic reaction site.

In another embodiment, a microfluidic synthesis platform includes a microfluidic chip holder comprising a computer controlled heating element and cooling element. A microfluidic chip is mountable in the microfluidic chip holder, the microfluidic chip being formed from a hydrophobic substrate having patterned thereon a hydrophilic reaction site and a plurality of hydrophilic channels or pathways extending outward from the hydrophilic reaction site and terminating at respective loading sites on the substrate, wherein the hydrophilic channels or pathways are tapered with an increasing width in an inward direction from the loading sites to the hydrophilic reaction site. The microfluidic synthesis platform includes a fixture holding a plurality of non-contact reagent dispensing devices disposed above the microfluidic chip at locations corresponding to the loading sites of the plurality of hydrophilic channels or pathways, the fixture further holding a moveable collection tube disposed above the hydrophilic reaction site of the microfluidic chip.

In yet another embodiment, a method of using the microfluidic synthesis platform described herein includes loading one or more liquid droplets containing reactants onto one or more of the plurality of hydrophilic channels or pathways of the microfluidic chip via one or more of the non-contact reagent dispensing devices, whereby the liquid droplets spontaneously move to the hydrophilic reaction site; and reacting the reactants at the hydrophilic reaction site.

In still another embodiment, a method of synthesizing [$^{18}$F]fallypride using the microfluidic synthesis platform includes loading one or more droplets containing [$^{18}$F] fluoride solution onto of the hydrophilic channels or pathways, wherein the droplet containing [$^{18}$F]fluoride solution automatically transports to the hydrophilic reaction site; heating the microfluidic chip with the heating element to evaporate the droplet(s) containing [$^{18}$F]fluoride solution; loading one or more droplets containing fallypride precursor solution at another loading site, wherein the droplets containing fallypride precursor solution automatically transports to the hydrophilic reaction site; heating the microfluidic chip with the heating element to form [$^{18}$F]fallypride; loading a plurality of droplets of a diluting solution at another loading site, wherein the droplets containing the dilution solution automatically transports to the hydrophilic reaction site containing the [$^{18}$F]fallypride; and removing the droplet from the microfluidic chip (e.g., transferring a droplet containing the [$^{18}$F]fallypride to a vial, container via the collection tube, or other downstream process).

In yet another embodiment, a method of synthesizing [$^{18}$F]FDG using the microfluidic synthesis platform includes loading one or more droplets containing [$^{18}$F]fluoride/K222/K$_2$CO$_3$ solution onto of the hydrophilic channels or pathways, wherein the one or more droplets containing [$^{18}$F] fluoride/K222/K$_2$CO$_3$ solution automatically transports to the hydrophilic reaction site; heating the microfluidic chip with the heating element to evaporate the one or more droplets containing [$^{18}$F]fluoride/K222/K$_2$CO$_3$ solution; loading a plurality of droplets (or one or more droplets) containing mannose triflate solution at another loading site, wherein the droplets containing mannose triflate solution automatically transports to the hydrophilic reaction site; heating the microfluidic chip with the heating element; loading one or more droplets of sodium hydroxide solution at another loading site, wherein the one or more droplets containing sodium hydroxide solution automatically transports to the hydrophilic reaction site whereby a hydrolysis reaction takes place to generate [$^{18}$F]FDG; loading a plurality of droplets of a diluting solution at another loading site, wherein the droplets containing the dilution solution automatically transports to the hydrophilic reaction site; and removing the droplet from the microfluidic chip (e.g., transferring a droplet containing the [$^{18}$F]FDG to a vial, container, or other downstream process via the collection tube).

DETAILED DESCRIPTION OF ILLUSTRATED EMBODIMENTS

Figure 1:
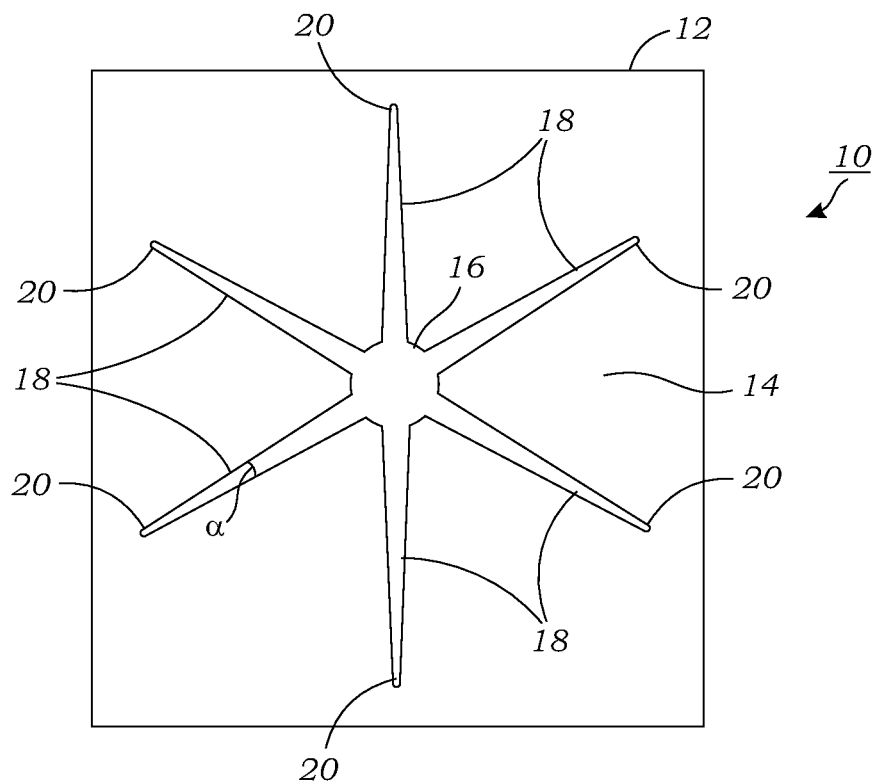
FIG. 1 illustrates a top-down view of the "passive" microfluidic chip that is used to perform radiochemical reactions using droplets.

FIG. 1 illustrates a top-down view of the "passive" microfluidic chip 10 that is used to perform radiochemical reactions using droplets 100 (seen in FIGS. 2, 3A, 3B, 5A, 5B). The microfluidic chip 10 includes a substrate 12 that may be made from a number of materials including silicon, glass, glassy carbon, metal, polymer-metal blend (including metallic particles in polymer to increase thermal conductivity; yet retains ability to be molded) or a polymer coated with a hydrophobic coating or layer (except for the hydrophilic features described in more detail below). In one particular preferred embodiment, silicon is used as the substrate 12 due to its hydrophilic nature and ease of use in manufacturing. The silicon substrate 12 contains a patterned hydrophobic layer 14 (e.g., Polytetrafluoroethylene (PTFE)) thereon where the openings or windows in the hydrophobic layer 14 define the hydrophilic features on the microfluidic chip 10. In the embodiment of FIG. 1, there is a star-shaped opening in the hydrophobic layer 14 that defines the hydrophilic features. In one preferred embodiment, the microfluidic chip 10 includes a central hydrophilic reaction or collection site 16 and a plurality of hydrophilic channels or pathways 18 extending outwardly or away from the hydrophilic reaction or collection site 16. In some embodiments, the hydrophilic channels or pathways 18 may extend radially outward from the central hydrophilic reaction or collection site 16 (which may not be circular in shape). In some embodiments, the hydrophilic channels or pathways 18 may generally have a linear or straight configuration. However, in other embodiments, the hydrophilic channels or pathways 18 may be curved or have one or more curved segments or regions. In some embodiments, the hydrophilic channels or pathways 18 each terminate at respective loading sites 20 on the substrate 12. In other embodiments, the loading sites 20 may be located on separate locations or pathways that interface with the hydrophilic channels or pathways 18 that deliver droplets 100 to the hydrophilic reaction or collection site 16. The hydrophilic channels or pathways 18 function as tracks which carry the liquid droplets 100 toward the hydrophilic reaction or collection site 16. The loading sites 20 are used to load the passive microfluidic chip 10 with a liquid (e.g., liquid droplet 100). The loading site 20 may be located anywhere on the microfluidic chip 10 but in the illustrated embodiment is located near the periphery or outer edge of the passive microfluidic chip 10. The loading sites 20 may be used to deposit droplets 100 containing various reagents, precursors, solvents, and the like that are used in the radiosynthesis. This includes, for example, radioisotopes or prosthetic groups that are known to those skilled in the art for radiosynthesis reactions.

Each of the hydrophilic channels or pathways 18 are tapered with an increasing width as one proceeds in an inward direction to the hydrophilic reaction or collection site 16. The hydrophilicity of the exposed silicon features (e.g., reaction or collection site 16 and channels or pathways 18) may be enhanced by exposing the same to a Piranha cleaning solution as explained herein during the manufacturing process. In some embodiments, the hydrophilic reaction or collection site 16 and the hydrophilic channels or pathways 18 may be rendered or made superhydrophilic while the hydrophobic layer 14 may be superhydrophobic.

Figure 2:
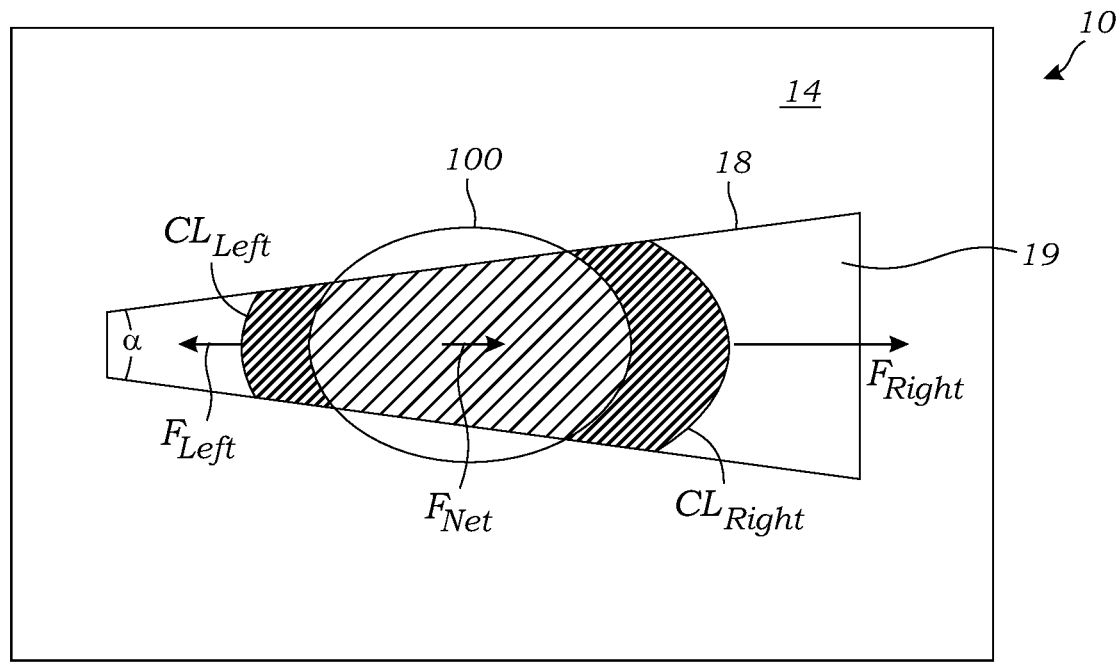
FIG. 2 illustrates a schematic representation of a single hydrophilic channel or pathway of a microfluidic chip illustrating the forces that automatically and naturally move the droplet in the direction of the widening channel or pathway.

In one embodiment, the central hydrophilic reaction or collection site 16 has a diameter of around 2.0-3.0 mm. As seen in FIGS. 1 and 2, the hydrophilic channels or pathways 18 have a taper angle α that is at least about 4°. For example, taper angles of 5°, 6°, 7°, 8°, 9°, 10°, and above will work. The length of the hydrophilic channels or pathways 18 from the loading site 20 to the central hydrophilic reaction or collection site 16 is 9.7 mm, although other dimensions may be used. The hydrophilic channels or pathways 18 which have a wedge shape have a width at its narrowest point at the loading site 20 of 0.17 mm. In the embodiment illustrated in FIG. 1, there are six (6) hydrophilic channels or pathways 18 that extend radially outward from the central hydrophilic reaction or collection site 16. It should be understood, however, that different numbers of hydrophilic channels or pathways 18 may be used in the microfluidic chip 10.

FIG. 2 illustrates the driving force ($F_{Net}$) that is imparted onto a droplet 100 of liquid that is positioned on the microfluidic chip 10. Illustrated is a single delivery channel or pathway 18 of the passive microfluidic chip 10. The delivery channel or pathway 18 is defined by a hydrophilic surface 19 that is formed on the substrate 12 and is surrounded by a hydrophobic surface or layer 14 that is formed on the substrate 12. The delivery channel or pathway 18 is tapered and expands in one direction; namely the direction in which the droplet 100 of liquid spontaneously travels. The delivery channel or pathway 18 functions as a track on which droplets 100 spontaneously move. As seen in FIG. 2, $F_{Net}$ is the net surface tension force ($F_{Right}-F_{Left}$) the liquid droplet 100 experiences along the leading and trailing boundaries ($CL_{Right}$ and $CL_{Left}$) of the liquid footprint. Due to the longer contact line CL at the wider region ($CL_{Right}$) of the delivery channel or pathway 18, $F_{Net}$ drives the liquid in the direction of the wider track as shown by the arrow $F_{Net}$ on the droplet 100.

With reference to FIG. 1, to use the microfluidic chip 10, reagents and reactants are loaded onto the loading sites 20 as droplets 100. The droplets 100 may be loaded manually using, for example, a pipette or the like. In other embodiments, however, automatic non-contact dispensing devices 76 are used to dispense droplets 100 on the loading sites 20. The volume of droplets 100 may vary but generally is around 0.25 µL to several microliters although the particular volume may vary depending on the dimensions of the hydrophilic features formed on the microfluidic chip 10. As noted herein, once the droplets 100 have been placed on the loading site(s) 20, the droplets 100 automatically and without any assistance, move to the hydrophilic reaction or collection site 16 where the droplet 100 remains. In some embodiments, the droplet 100 may be evaporated at the reaction or collection site 16 by the application of external heat (e.g., using heating element described herein). Compounds or other species contained in the droplet 100 are then deposited at the reaction or collection site 16 in dried form. The dried compound or other reactant can then be reacted with another compound contained in a different droplet 100 that is loaded onto the loading site 20 (which may be a different loading site 20) which then travels to the reaction or collection site 16. In addition to reactions taking place at the reaction or collection site 16, droplets 100 containing a solvent can be used to dissolve a dried species or compound that is located on the reaction or collection site 16. The reaction or collection site 16 may also be used for mixing of multiple droplets.

Figure 3A:
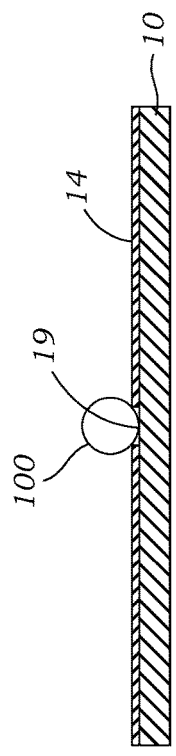
FIG. 3A is a cross-sectional view of a microfluidic chip according to one embodiment that has an open or exposed top.
Figure 3B:
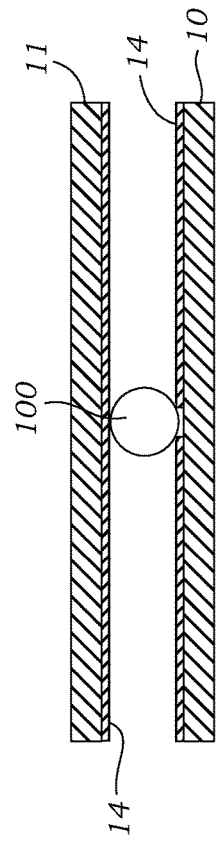
FIG. 3B is a cross-sectional view of a microfluidic chip according to another embodiment that has a top or upper surface that defines a gap or space where the droplet(s) reside.

In some embodiments, the surface of the passive microfluidic chip 10 may be open or exposed to the external environment (i.e., there is no top) as is illustrated in the cross-sectional view of FIG. 3A. Alternatively, in other embodiments as illustrated in the cross-sectional view of FIG. 3B, there may be a top surface 11 that defines a space or gap where the droplets 100 are confined. Thus, the microfluidic chip 10 can be operated with droplets 100 open at the top, or can be covered with a hydrophobic-coated 14 top substrate 11. Such a top 11 or cover plate helps limit evaporation, but reduces the volume capacity of the tracks and reaction region.

Figure 4:
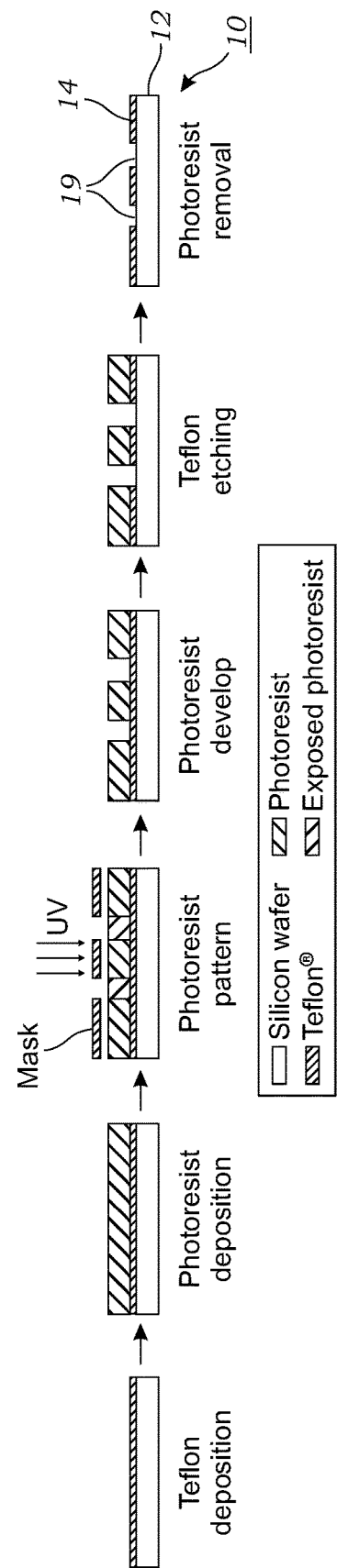
FIG. 4 illustrates an example of a fabrication process used to make the passive microfluidic chip.

To fabricate the chip as seen in FIG. 4, a four (4) inch silicon wafer was spin-coated with Teflon® AF 2400 solution (DuPont®) at 1,000 rpm for 30 seconds and then heated on a hotplate at 160° C. for 10 minutes, 245° C. for 10 minutes, and then annealed in an oven (HTCR 6 28, Carbolite, UK) at 340° C. for 3.5 hours under nitrogen atmosphere. The final thickness of the Teflon layer was ~150 nm as measured by surface profilometry (Dektak 150, Veeco, Plainview, N.Y., USA). The Teflon® layer was patterned via dry etching. A positive photoresist (SPR 220-7; MicroChem) layer was spin-coated at 3,000 rpm for 30 seconds on top of the Teflon® and then soft baked at 115° C. for 3 minutes. After that, the photoresist layer was patterned by UV exposure (MA6 mask aligner, Karl Suss, Garching, Germany) and developed according to the manufacturer's recommended protocol. The exposed Teflon® regions were then etched away via 30 seconds exposure to oxygen plasma (PlasmaLab system 80 RIE plus, Oxford Instruments, UK) at 100 mTorr pressure, 200 W power and 50 sccm oxygen flow. The wafer was then diced into individual 25.0×27.5 mm microfluidic chips 10 manually with a silicon wafer cutter. Afterwards, the microfluidic chips 10 were dipped into acetone for 1 minute to remove photoresist, rinsed in isopropyl alcohol (IPA) for 1 minute, and dried with nitrogen. To further increase the hydrophilicity of the patterned surface, the microfluidic chips were cleaned with Piranha cleaning solution (96% sulfuric acid; 30% hydrogen peroxide, 3:1 v/v mixture) prior to use. Contact angles of the surface at different steps was measured with a contact-angle goniometer (VCA-30005, AST, Billerica, Mass., USA) as are illustrated below in Table 1 (contact angle measurements made with a droplet (~2 µL) of DI water).

TABLE 1

| Treatment | Contact angle (°) (n = 3) |
| --- | --- |
| Initial Si wafer | 41 ± 4 |
| Hydrophobic region before patterning | 122 ± 2 |
| Hydrophilic region (after acetone wash) | 57 ± 10 |
| Hydrophilic region (after Piranha clean) | 7 ± 3 |

Figure 5A:
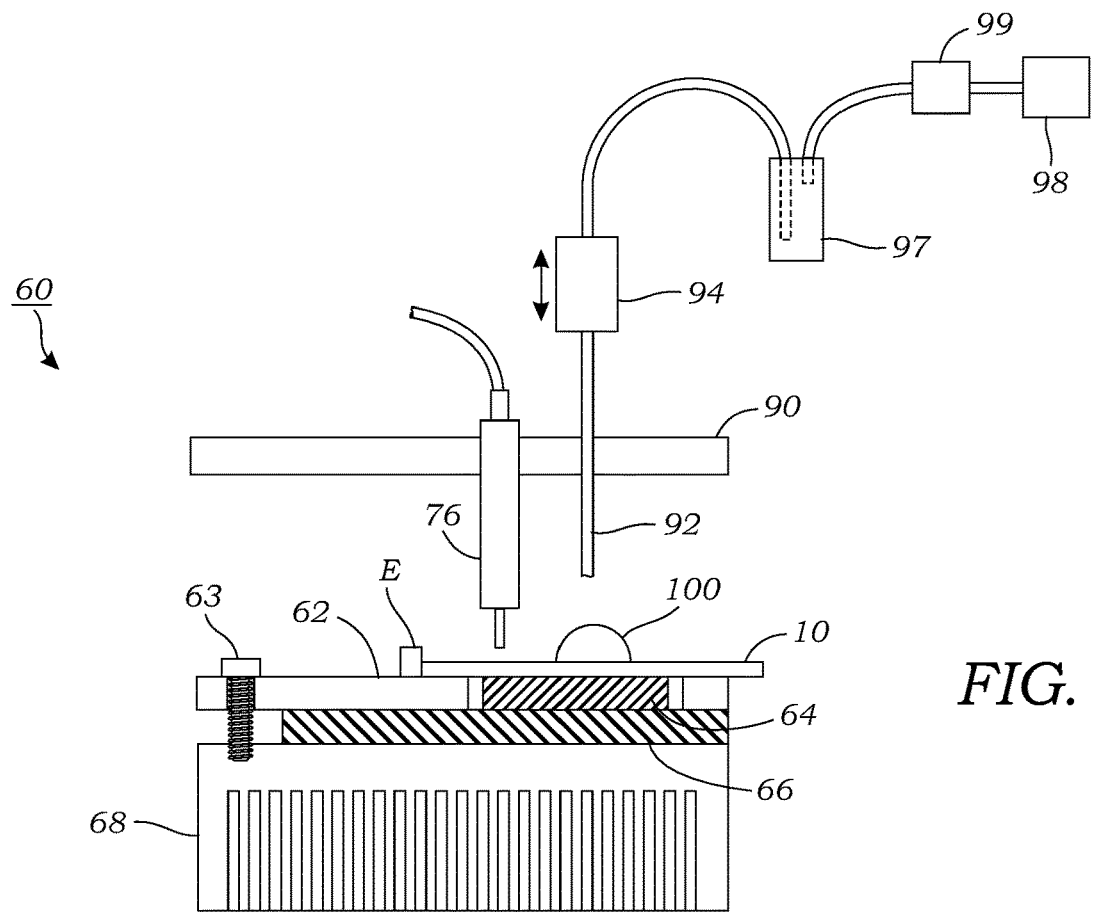
FIG. 5A illustrates a temperature controlled synthesis platform that was used to control the dispensing of reagents and the collection of the final product on a microfluidic chip mounted thereon.
Figure 5B:
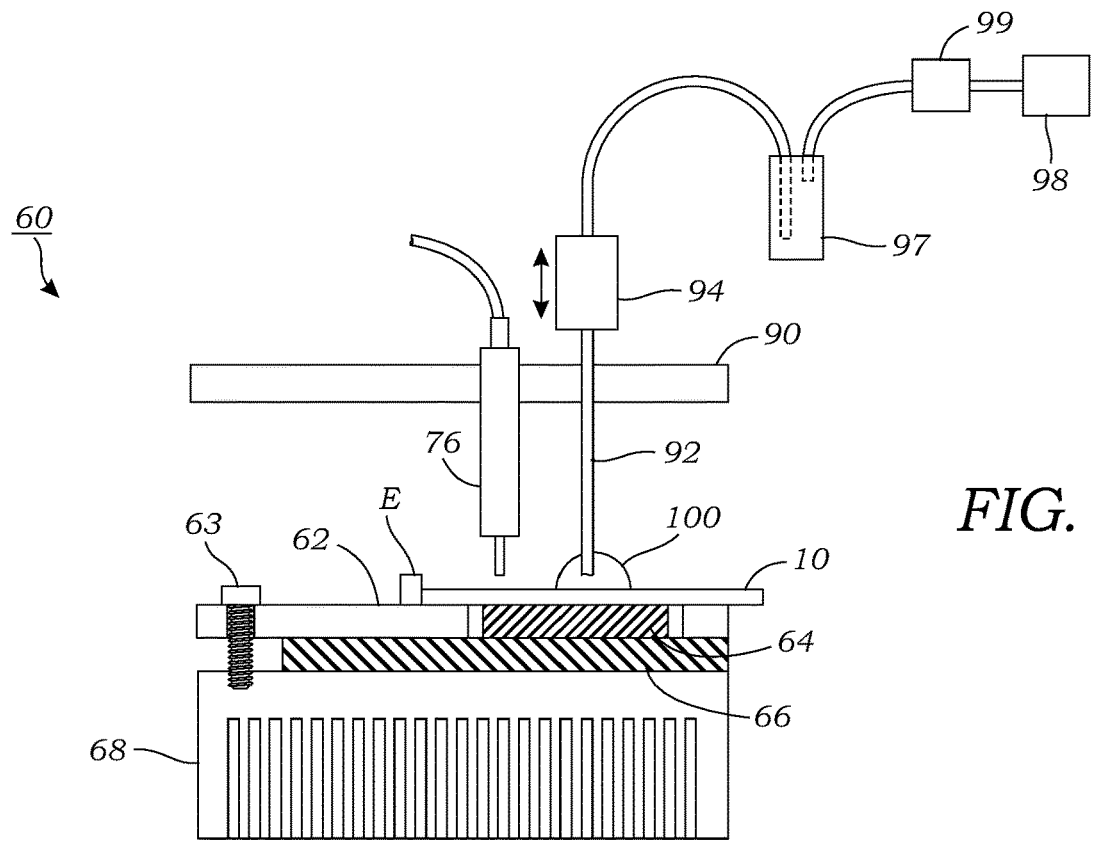
FIG. 5B illustrates the temperature controlled synthesis platform of FIG. 5B with a collection tube actuated to come into contact with a droplet located on the reaction or collection site.
Figure 6:
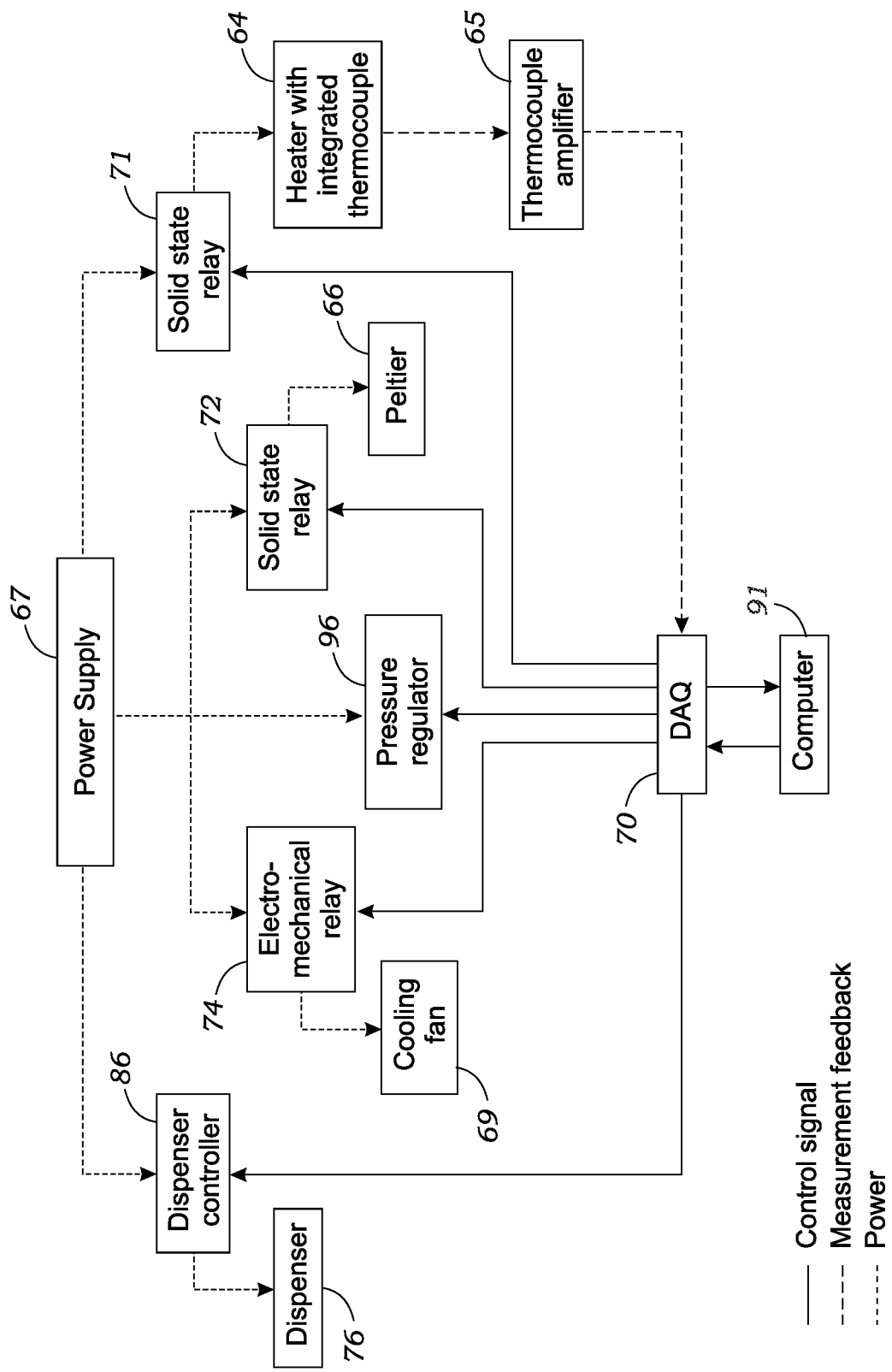
FIG. 6 illustrates a wiring diagram of the temperature controlled synthesis platform of FIGS. 5A and 5B.

For automated droplet reactions, a custom-built temperature controlled synthesis platform 60 was used to control the dispensing of reagents and the collection of the final product. FIGS. 5A and 5B illustrate the microfluidic synthesis platform 60 that was used for experiments with FIG. 5B illustrating actuation of a collection tube 92 used to collect the droplet 100 containing the final reaction product (or other droplet located at the reaction or collection site 16). The microfluidic synthesis platform 60 includes a chip holder 62 that supports the microfluidic chip 10 during the synthesis process. The chip holder 62 holds the microfluidic chip 10 above a heating element 64 (i.e., ceramic heater; Ultramic CER-1-01-00098, Watlow, St. Louis, Mo., USA) that is in direct thermal contact with the underside surface of the microfluidic chip 10. The heater 64 was affixed atop a 40 cm×40 cm thermoelectric cooling device 66 (Peltier, Vt.-199-1.4-0.8, TE Technology, Traverse City, Mich., USA) mounted to a heatsink 68 and cooling fan 69 (as seen in FIG. 6; AFB0512VHD, Delta Electronics, Taipei, Taiwan).

The chip holder 62 was made as a plastic frame above the Peltier cooling device 66 (and bolted to the heatsink 68 via bolt 63) helped keep the heater 64 in place while also providing two flat vertical edges E for rapidly positioning one corner of the microfluidic chip 10. The signal from a K-type thermocouple embedded in the heater 64 was amplified through a K-type thermocouple amplifier 65 (FIG. 6; AD595CQ, Analog Devices, Norwood, Mass., USA) and connected into a data acquisition device 70 (DAQ; NI USB-6211, National Instruments, Austin, Tex., USA). A digital output of the DAQ 70 was used to drive a solid-state relay 71 (SSR, Model 120D25, Opto 22, Temecula, Calif., USA) to control the supply of 120 VAC to the heater 64 from a power supply 67. An on-off temperature controller was programmed in LabView (National Instruments). To cool the heater, the Peltier cooling device 66 was driven by a 24V power supply 67 (TDK-Lambda Americas, National City, Calif., USA) operated through another solid state relay 72 controlled by the LabView software program running on computer 91 as seen in FIG. 6. The cooling device 66 ensures that the microfluidic chip 100 can be rapidly cooled to accelerate the synthesis process. A power step down module ((not shown; 2596 SDC, Model 180057, DROK, Guangzhou, China) was connected to a 24V power supply 67 to provide 12V for the cooling fan 69, which was switched on during cooling via an electromechanical relay 74b (SRD-05VDC-SL-C, Songle Relay, Yuyao city, Zhejiang, China) controlled by the LabView program.

Figure 7:
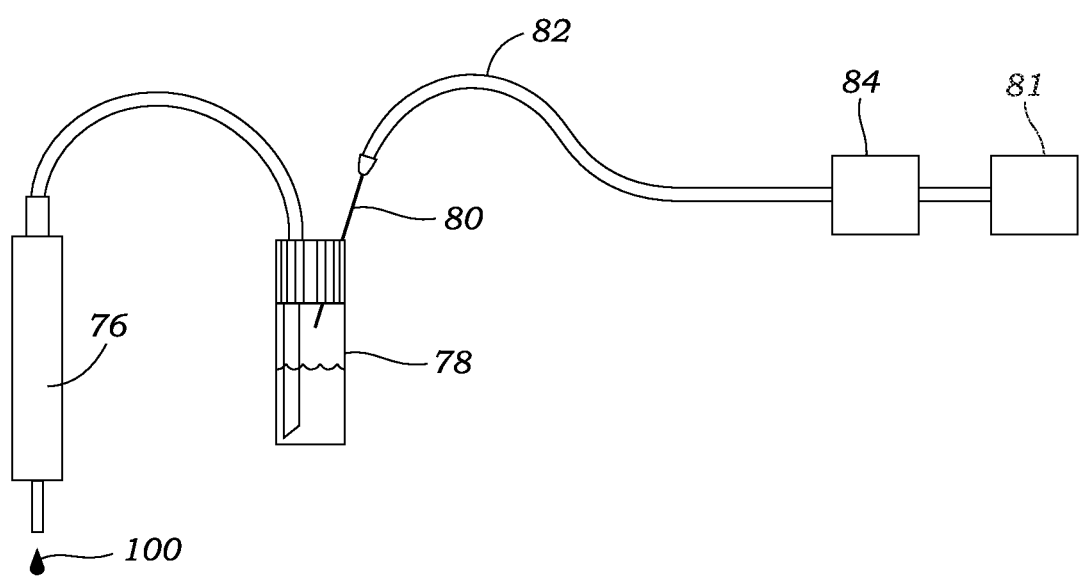
FIG. 7 illustrates one embodiment of a non-contact dispenser coupled to a container or vial having a fluid or reagent source contained therein. A source of pressurized inert gas is in fluid communication with the headspace above the liquid to advance fluid from the container or vial to the non-contact dispenser.

With reference to FIGS. 5A, 5B, and 6, droplets 100 were loaded onto the microfluidic chip 10 at reagent loading sites through miniature, solenoid-based, non-contact dispensers 76 (INKX0514300A and INKX0514100A, Lee Company, Westbrook, Conn., USA). A different dispenser 76 (INKX0514100A) with seal material made of FFKM was used to dispense the fallypride precursor solution. Other solutions were loaded through dispensers 76 (INKX0514300A) with seal material EPDM. As best seen in FIG. 7, the inlet of each dispenser 76 was connected to a 1 mL glass V-vial 78 (03-410-024, V Vial™ with Open-Top Screw Cap, Wheaton, Millville, N.J., USA) sealed with a septum (224100-072, Wheaton) via ETFE tubing (1/16" OD, 0.010" ID, 1529 L, IDEX Health & Science, Oak Harbor, Wash., USA). The septum was pre-punched with a 1 mm OD biopsy punch (Integra Miltex, York, Pa., USA). A bevel was cut on the end of the tubing and positioned at the bottom of the vial 78. Nitrogen pressure from pressured source of gas 81 was supplied to the headspace of the vial via a 25 G needle 80 (Beckton Dickinson, Franklin Lakes, N.J., USA) inserted directly through the septum. The needle 80 was connected via 1/8" OD tubing 82 to the output of an electronic pressure regulator 84 (ITV0030-3UBL, SMC Corporation, Noblesville, Ind., USA) controlled by the LabView program run by computer 91.

Reagent stock solutions can be pipetted directly into the vial 78. For precursor solution and [18F]fluoride solution, the smaller volume (30-50 µL) was loaded into a 250 µL vial insert (5181-1270, Agilent Technologies, Santa Clarita, Calif., USA) installed into the V-vial. The outlet of each dispenser 76 was fitted with a nozzle (ID 0.005", INZA4650935K, Lee Company), which is recommended for generation of droplets with volume in the range of 100 s of nL to several µL. With reference to FIG. 6, each dispenser 76 was powered via a dedicated driver circuit 86 (IECX0501350A, Lee Company) that was powered by a 3V power source 67 and controlled via the LabView program on the computer 91 using DAQ 70. Note that because the dispensing rate depends on the driving pressure, viscosity of solvent, tubing size, and nozzle size, a calibration was performed for each type of liquid to determine the valve opening time that should be used to dispense a particular volume. Before use, each dispenser 76 was manually primed (using 3 psi nitrogen) to ensure all air ahead of the liquid was eliminated.

While the above describes the [$^{18}$F]fluoride solution being loaded into a vial or other container that is connected to the dispenser 76 it should be appreciated that the [$^{18}$F]fluoride solution may also come directly from the cyclotron, a fluoride dispenser, a fluoride concentrator, or any other source. In such configurations a vial may not be needed for fluoride loading as the [$^{18}$F]fluoride solution may come from tubing, nozzle, or other dispenser.

A fixture 90 was built to hold six (6) dispensers 76 with nozzles ~2 mm above the six (6) loading sites of the microfluidic chip 10 (only one such dispenser 76 is illustrated in FIGS. 5A and 5B). Each dispenser 76 was secured within a hole by an O-ring (ORBN005, Buna-N size 005, Sur-Seal Corporation, Cincinnati, Ohio, USA). After completing the multi-step reaction, each dispenser 76 was flushed with 1 mL of DI water and MeOH sequentially at 69 kPa (~10 psi), and dried with nitrogen for 2 min.

A liquid collection subsystem was implemented in the microfluidic synthesis platform 60 to transfer the final crude reaction product droplet 100 from the microfluidic chip 10 to the collection vial. As seen in FIGS. 5A and 5B, a 23 G hypodermic metal tubing 92 (304H23XX, MicroGroup, Medway, Mass., USA) was inserted through a hole in the center of the dispenser fixture 90. The height of this tube 92 was controlled by mounting it on a single-acting pneumatic cylinder 94 (6498K511, McMaster-Carr, Santa Fe Springs, Calif., USA). The pneumatic cylinder was activated by applying 138 kPa (~20 psi) pressure from an electronic pressure regulator 96 (FIG. 6; ITV0030-3UBL, SMC Corporation) controlled by the LabView program via DAQ 70. In its non-active position, the end of the tubing 92 was ~55.5 mm above the surface of the microfluidic chip 10. The droplet 100 was collected by making close contact (~0.5 mm) to the chip 10, and applying vacuum to the headspace of the collection vial 97 using a compact vacuum pump 98 (0-16" Hg vacuum range, D2028, Airpon, Ningbo, China) connected via a vacuum regulator 99 (ITV0090-3UBL, SMC Corporation). Vacuum pressure was ramped from 0 to 21 kPa (~3 psi, 0.01 psi increment every 100 ms) over 30 seconds to collect the crude product droplet 100. In some configurations, the tube 92 may be used to aspirate the droplet 100 from the surface of the microfluidic chip 10 and direct the droplet 100 for further processing such as purification and/or formulation.

Example: Radiosynthesis of [$^{18}$F]Fallypride

Figure 8:
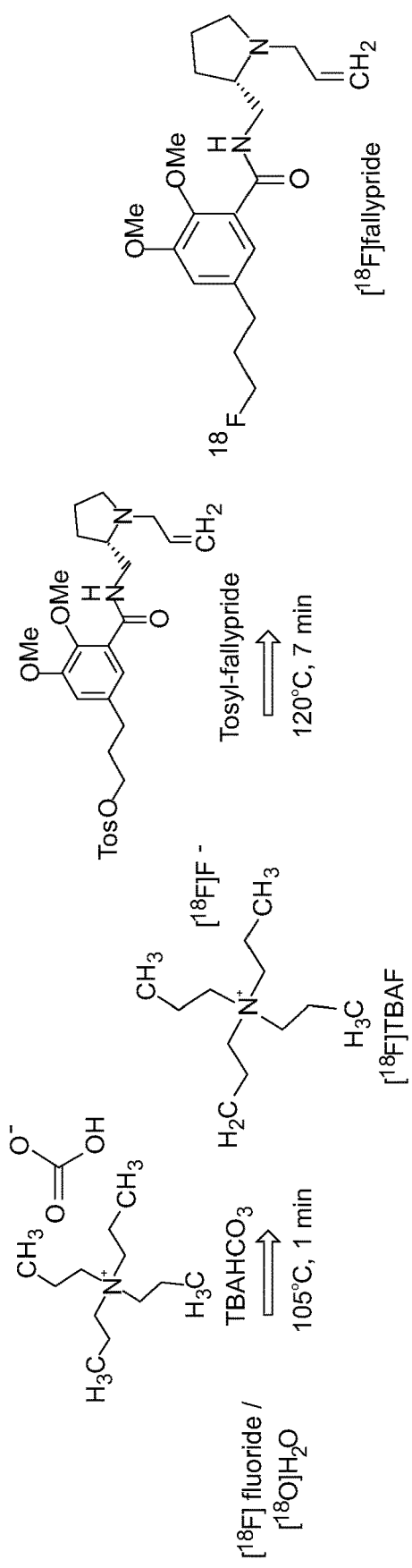
FIG. 8 illustrates the synthesis steps for the radiosynthesis of [$^{18}$F]fallypride illustrating [$^{18}$F]fluoride drying step followed by radiofluorination of precursor.
Figure 9:
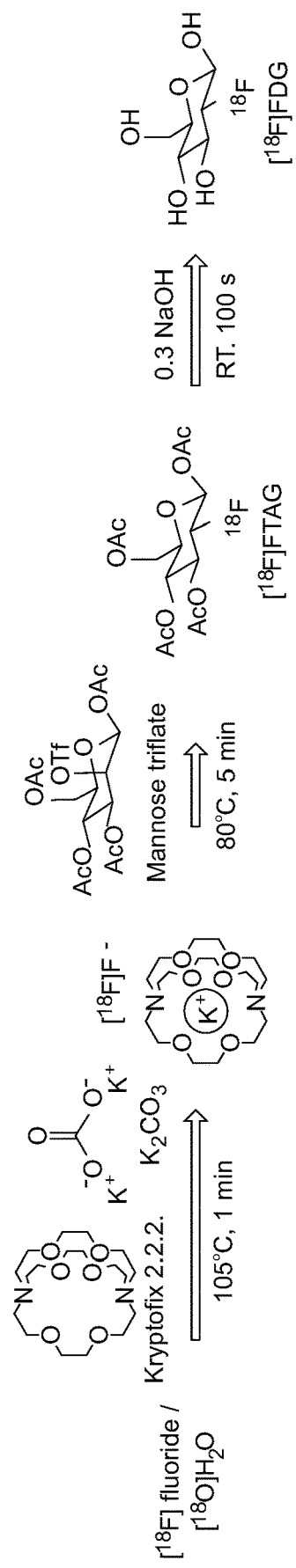
FIG. 9 illustrates the synthesis steps for the radiosynthesis of [$^{18}$F]FDG, showing the [$^{18}$F]fluoride drying step, followed by radiofluorination of the precursor and the deprotection (hydrolysis) reaction.

Prototype passive microfluidic chips 10 were first used to test the feasibility of multi-step radiochemical reactions. In a first example, the synthesis of [$^{18}$F]fallypride, a tracer for brain imaging used in PET and related to neuropsychiatric conditions and aging, was performed on a passive microfluidic chip 10 that was loaded manually. In this first experiment, the prototype passive microfluidic chip 10 included a single hydrophilic reaction or collection site 16 and a single hydrophilic channel or pathway 18 (i.e., "one track chip"). As explained below, an additional manual experiment was carried out on a passive microfluidic chip 10 that included a plurality of hydrophilic channels or pathways 18. The synthesis scheme of [$^{18}$F]fallypride is seen in FIG. 8. The synthesis of [$^{18}$F]fallypride requires activation of the cyclotron-produced [$^{18}$F]fluoride via evaporative drying, followed by a fluorination reaction. Prototype passive microfluidic chips of the type described herein were used. A heating/cooling unit (similar to that in FIGS. 5A and 5B) was placed in thermal contact with the underside of the passive microfluidic chip to heat or cool the reaction site for the synthesis operations. 5 µL tetrabutylammonium bicarbonate (TBAHCO$_3$, 75 mM) was diluted in 100 µL [$^{18}$O]H$_2$O/[$^{18}$F]fluoride to reach a final concentration of TBAHCO$_3$ of 3.75 mM. 4 mg tosyl-fallypride precursor was dissolved in 100 µL mixture of acetonitrile and thexyl alcohol to reach a final concentration of 77 mM. An 2 µL droplet of [$^{18}$F]TBAF was loaded on the narrow end of a tapered delivery channel, and the droplet spontaneously moved to the reaction site. The heater was set to 105° C. for 1 minute to evaporate solvent from mixture and leave the dried [$^{18}$F]TBAF in the reaction site. A 2 µL tosyl-fallypride precursor droplet was loaded on the narrow end of a separate delivery channel, and the droplet spontaneously moved to the reaction site. The heater was set to 120° C. and maintained for 7 minutes to perform fluorination reaction and set to 30° C. A 5 µL droplet of MeOH was loaded on the separate delivery channel and spontaneously moved to the reaction site to dissolve the mixture product. The dissolved mixture product was extracted from reaction site with a pipette manually. The loading and extracting processes were repeated four (4) times to ensure collection of majority of mixture product.

Performance was assessed via measurements of radioactivity (via dose calibrator) at the beginning and ending of each step. Fluorination efficiency of the extracted product was measured via radio thin layer chromatography (radio-TLC, Minigita Star detector, BakerFlex IB-F silica gel plates, mobile phase 60% MeCN in 25 mM ammonium formate aqueous solution with 1% TEA). Crude radiochemical yield (crude RCY) is fluorination efficiency multiplied by extracted radioactivity, divided by starting radioactivity. Distribution of radioactivity on the passive chip after each step was assessed via Cerenkov imaging.

[$^{18}$F]fallypride synthesis on the prototype ("one track chip") passive microfluidic chip exhibited 89±2% fluorination efficiency (n=3) and 60±3% crude RCY (n=3), which are comparable to the performance on an EWOD chip (crude RCY, 84±7%, n=6). Activity loss at each step was calculated for future protocol optimization, all details of performance were summarized in Table 2 below.

TABLE 2

| Parameter | Value (N = 3) |
|---|---|
| Starting activity (mCi) | 0.1~0.2 |
| Evaporation loss (%) | 3 ± 1 |
| Fluorination loss (%) | 18 ± 0 |
| Extraction loss (%) | 11 ± 4 |
| Fluorination efficiency (%) | 89 ± 2 |
| Crude product yield (%) | 60 ± 3 |

The distribution of radioactivity at various stages verified that majority of activity was moved to the reaction site, and minimal residual radioactivity was left in the reaction site after extraction.

Figure 10:
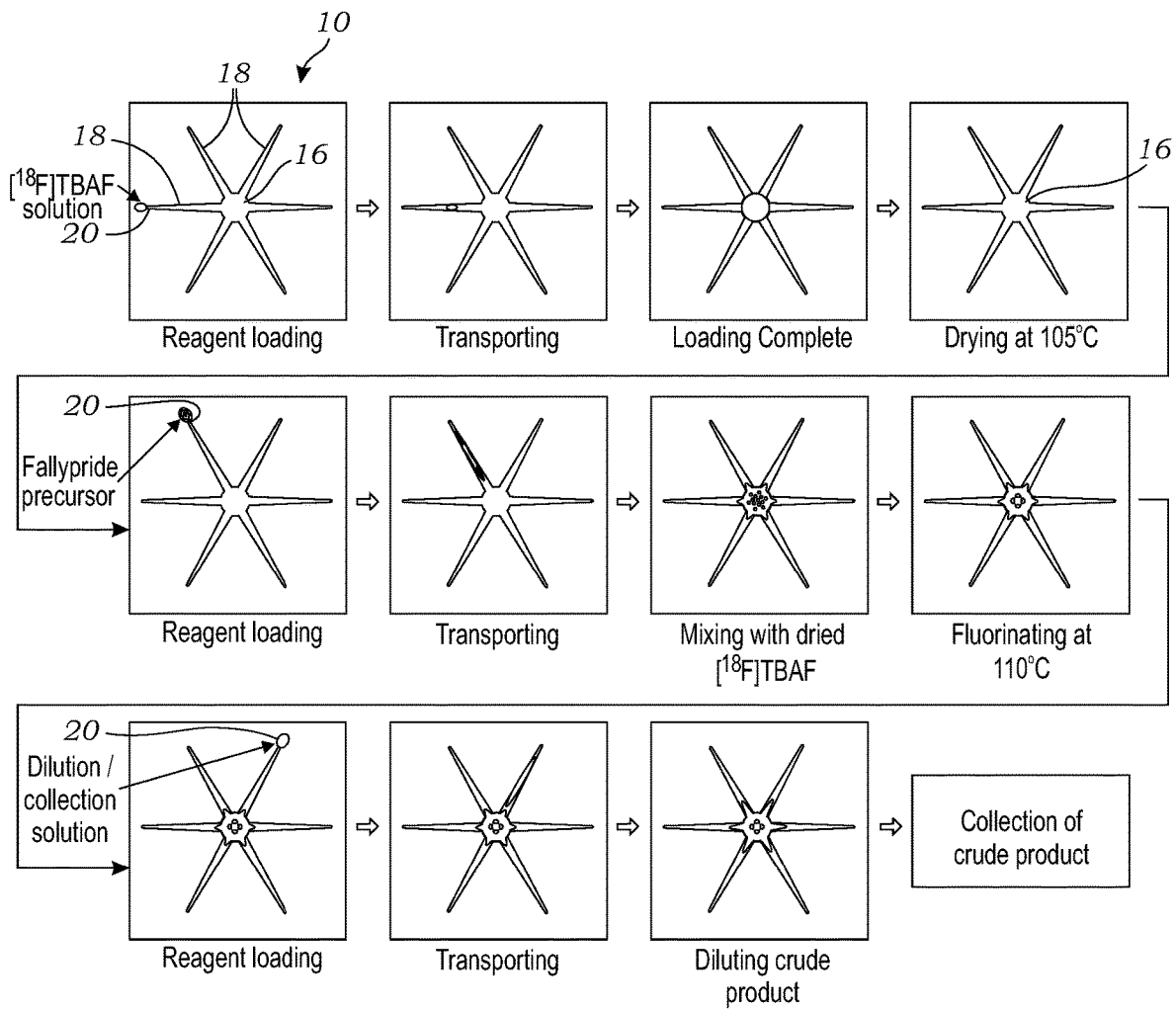
FIG. 10 illustrates the sequence of operations for the synthesis of [$^{18}$F]fallypride using the microfluidic chip.

[$^{18}$F]fallypride was also synthesized without pipetting using the automated microfluidic synthesis platform 60 illustrated in FIGS. 5A and 5B to transfer liquids to and from the microfluidic chip 10. FIG. 10 illustrates the sequence of operations for the synthesis of [$^{18}$F]fallypride using the microfluidic chip 10. The microfluidic chip 10 that was used in all experiments used a taper angle of 5°. A [$^{18}$F]fluoride stock solution was prepared by mixing [$^{18}$F]fluoride/[$^{18}$O] H$_2$O (100 µL, ~0.37 GBq, ~10 mCi) with 75 mM TBAHCO$_3$ solution (5 µL). Precursor stock solution was prepared by dissolving fallypride precursor (4 mg) in a mixture of MeCN and thexyl alcohol (1:1 v/v, 100 µL). A stock solution for dilution of the crude product prior to collection was prepared from a mixture of MeOH and DI water (9:1, v/v, 500 µL). These solutions were loaded into individual reagent vials connected to dispensers. To perform the on-chip synthesis, a 2 µL droplet of [$^{18}$F]fluoride solution (~0.0037 GBq-0.0074 GBq, ~0.1-0.2 mCi) was first loaded onto the chip and spontaneously transported to the reaction site. The microfluidic chip was heated to 105° C. for 1 minute to evaporate the solvent and leave a dried residue of the [$^{18}$F]tetrabutylammonium fluoride ([$^{18}$F]TBAF) complex at the reaction site. It was found that the typical azeotropic distillation process (i.e., addition and evaporation of MeCN) to remove residual moisture was not needed. Next, a 1 µL droplet of fallypride precursor solution was deposited at another loading site and was spontaneously transported to the reaction site, where it dissolved the dried residue. Then, another 1 µL droplet of fallypride precursor solution was deposited and transported the same way. The chip was heated to 110° C. and held for 7 minutes to accomplish the radiofluorination reaction. Then, ten 1 µL droplets of collection solution were sequentially deposited at a different reagent loading site 20 and spontaneously moved to reaction site to dilute the resulting crude reaction mixture. Afterwards, the diluted droplet was transferred into the collection vial. The collection process was repeated 5× to minimize residue on the chip. A schematic of the on-chip synthesis process is shown in FIG. 10.

The performance of [$^{18}$F]fallypride synthesis for both manual synthesis and automated synthesis is summarized in Table 3 below.

TABLE 3

| Parameter | Manual synthesis | Automated synthesis |
|---|---|---|
| Fluorination efficiency (%) | 74 ± 8 | 76 ± 4 |
| Radioactivity recovery (%) | 79 ± 4 | 84 ± 4 |
| Collection efficiency (%) | 90 ± 4 | Not measured |
| Synthesis time (min) | 25 ± 3 | 20 ± 1 |
| Crude RCY (%) | 59 ± 9 | 64 ± 6 |
| Isolated RCY (%) | NA | 46 ± 4 |

With manual operations, the fluorination efficiency was 74±8% (n=4), collection efficiency was 90±4% (n=4), and the crude RCY was 59±9% (n=4). Analysis of radioactivity measurements during the synthesis on passive chips showed negligible losses (−3±1%, n=4, relative to the starting radioactivity) during drying of [$^{18}$F]fluoride, but slightly higher losses of 15±2% (n=4) during fluorination and 9±4% (n=4) residual activity on chip and pipette tips after collection. Note that the negative evaporation loss is likely due to measurement error in the dose calibrator. The crude RCY was slightly lower than previously reported for the droplet-based synthesis using EWOD chips, i.e. 84±7% (n=6). The reported fluorination and collection efficiencies on EWOD were 90±9% (n=6) and 94±3% (n=6), respectively, suggesting the current platform and reaction conditions give slightly lower fluorination efficiency. The synthesis time (up to the end of the collection process) for [$^{18}$F]fallypride was ~25 min.

Automated loading and collection provided a marginal increase in the crude RCY of [$^{18}$F]fallypride to 64±6% (n=4). The isolated RCY was 46±4% (n=4). Typically, in macroscale synthesis, about 5-10% of the radioactivity of the crude product can be lost during purification and formulation. Here about 28% of the activity was lost, suggesting that significant improvements can be made, perhaps in injection of the small volume of collected product into the HPLC system. The synthesis time was reduced to ~20 minutes (~12 minutes for drying and fluorination steps and ~8 minutes for collection) due to elimination of manual steps. This time is slightly shorter than reported for EWOD-based synthesis (i.e., ~31 minutes for [$^{18}$F]fallypride). The synthesis time is also somewhat shorter than macroscale processes (~29 minutes for [$^{18}$F]fallypride). It should be pointed out that purification and formulation times were omitted for comparison purposes, but it is expected that these processes could be performed more quickly than in the reported macroscale methods due to the smaller crude reaction product volume. This smaller volume can accelerate both the purification and formulation processes. The time for collection can possibly be further condensed by optimizing the speed of the product droplet collection process.

Example: Radiosynthesis of [$^{18}$F] FDG

[$^{18}$F]FDG is analogue of glucose and is by far the most commonly used PET imaging tracer. In an initial experiment, the fluorination of [$^{18}$F]FDG was performed using a microfluidic chip 10 having multiple tracks (e.g., like that illustrated in FIG. 1) to investigate the versatility of multi-step radiochemical reaction on the passive microfluidic chip 10 first using manual depositing of reagents and removal of product from the microfluidic chip. In this first, initial experiment involving [$^{18}$F]FDG, 20 μL, K$_{222}$ (797 mM) and K$_2$CO$_3$(199 mM) mixture dissolved in DI water was diluted in 100 μL [$^{18}$O]H$_2$O/[$^{18}$F]fluoride to reach a final concentration of K$_{222}$ 133 mM and K$_2$CO$_3$ 33 mM. 2 mg mannose triflate was dissolved in 40 μL DMSO to reach a final concentration 104 mM. A 2 μL droplet of [$^{18}$F]KF/K$_{222}$ complex was loaded on the narrow end of patterned delivery channel and the droplet spontaneously moved to the reaction site. The heating/cooling unit was set heat the chip to 105° C. for 1 minute to evaporate solvent from mixture and leave the dried [$^{18}$F]KF/K$_{222}$ complex in the reaction site. A 2 μL mannose triflate precursor droplet was loaded on the narrow end of a separate delivery channel and the droplet spontaneously moved to the reaction site. The heater was set to 80° C. and held 5 minutes to perform fluorination reaction and back to 30° C. A 5 μL droplet of mixture (60% MeOH, 40% DI water) was loaded on the separate delivery channel, and moved to the reaction site to dissolve the mixture product. The dissolved mixture product was extracted from reaction site with a pipette manually (in this initial experiment hydrolysis was not performed). The loading and extracting processes were repeated four (4) times. The same performance assessment were performed as for [$^{18}$F]fallypride. The crude RCY of [$^{18}$F]FDG fluorination on the passive microfluidic chip was 47±1% (n=3), and fluorination efficiency was 70±6% (n=3).

[$^{18}$F]FDG was also synthesized using the automated microfluidic synthesis platform 60 illustrated in FIGS. 5A and 5B. This full synthesis of [$^{18}$F]FDG (including hydrolysis) was also performed manually for comparison purposes. A K222/K$_2$CO$_3$ stock solution was prepared by dissolving Kryptofix K$_{2.2.2}$ (9 mg) and K$_2$CO$_3$ (1.8 mg) in DI water (60 μL). To produce a [$^{18}$F]fluoride stock solution, 5 μL of this first solution were mixed with [$^{18}$F]fluoride/[$^{18}$O]H$_2$O (45 μL, ~0.185 GBq, ~5 mCi). A precursor stock solution was prepared by dissolving mannose triflate (2.5 mg) in DMSO (100 μL). For the deprotection step, a NaOH solution (0.3N, 100 μL) was prepared. A stock solution for dilution of the crude product for collection was prepared from a mixture of MeOH and DI water (3:2, v/v, 500 μL). These solutions were loaded into individual reagent vials connected to dispensers.

Figure 11:
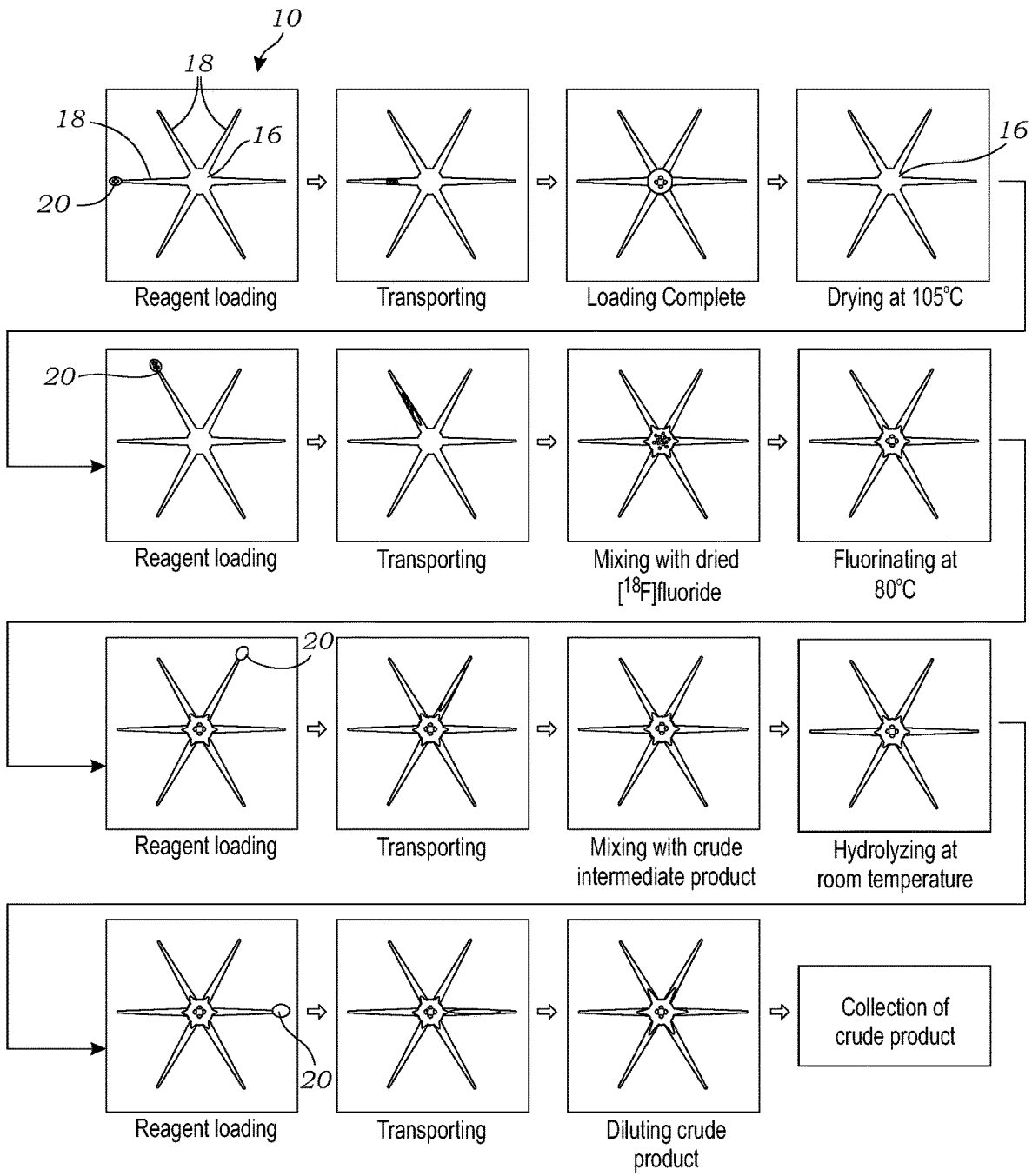
FIG. 11 illustrates the sequence of operations for the synthesis of [$^{18}$F]FDG using the microfluidic chip.

FIG. 11 illustrates the sequence of operations for the synthesis of [$^{18}$F]FDG using the microfluidic chip 10. For the synthesis, a droplet (2 μL) of [$^{18}$F]fluoride stock solution was first dispensed onto the microfluidic chip and spontaneously transported to the reaction site. The heater was set to 105° C. for 1 minute to remove the solvent and leave a dried residue of the [$^{18}$F]KF/K222 complex. Two droplets of FDG precursor solution (each 1 μL) were sequentially dispensed at another site and moved to the reaction zone. The temperature was raised to 80° C. for 5 minutes to perform the fluorination reaction. Subsequently, a droplet of NaOH solution (3 μL) was dispensed and transported to the reaction site, and the hydrolysis reaction was performed at room temperature for 100 seconds. Finally, twenty (20) droplets (0.5 μL each) of the collection solution were loaded on the chip sequentially and the resulting diluted crude product was transferred to the collection vial. This collection was repeated four more times.

[$^{18}$F]FDG was further purified with a custom miniaturized cartridge adapted from a commercially available FDG Purification cartridge for the base hydrolysis (Chromabond Set V, ABX). The commercial cartridge was designed for macroscale purification of [$^{18}$F]FDG and would result in too much dilution of the purified product when making small amounts of the tracer. Instead, custom cartridges were made by repacking the resin beads (18.4 mg cation exchange resin (PS-H$^+$), 18.2 mg anion exchange resin (PS-HCO$_3$), 30.4 mg neutral alumina (ALOX N) and 15.6 mg reversed-phase resin (HR-P)) inside a 0.063" ID perfluoroalkoxy alkane (PFA) tubing (ZEUS, Orangeburg, S.C., USA). The resins were sandwiched and separated with ~1.5 mm diameter fits (FRPE1CC, OROCHEM, Naperville, Ill., USA). Before use, the cartridge was pre-conditioned with 0.5 mL EtOH and then 1 mL DI water. During purification, the ~100 μL diluted crude product was passed through the cartridge, then an additional 300 μL DI water were used to collect the pure product.

The performance of [$^{18}$F]FDG synthesis (for both full manual synthesis and automated synthesis) is shown in Table 4 below.

TABLE 4

| Parameter | Manual synthesis | Automated synthesis |
|---|---|---|
| Fluorination efficiency (%) | 84 ± 4 | 72 ± 7 |
| Hydrolysis efficiency (%) | 100 ± 0 | 100 ± 0 |
| Radioactivity recovery (%) | 49 ± 12 | 69 ± 5 |
| Collection efficiency (%) | 70 ± 15 | Not measured |
| Synthesis time (min) | 18 ± 1 | 21 ±2 |
| Crude RCY (%) | 40 ± 8 | 50 ± 8 |
| Isolated RCY (%) | NA | 36 ± 6 |

With manual handling, the fluorination efficiency, collection efficiency and crude RCY were 84±4% (n=4), 70±15% (n=4) and 40±8% (n=4), respectively. The intermediate [$^{18}$F]FTAG was completely hydrolyzed into [$^{18}$F]FDG as determined by radio-TLC with hexane and ethyl acetate (1:1, v:v) mobile phase. Evaporation loss (1±2%, n=4) was minimal, but some radioactivity losses were observed during fluorination (30±3%, n=4), and there was significant residual radioactivity on the chip and pipette tips after collection (20±9%, n=4). These losses were comparable to the losses reported on EWOD platform (48±3%, n=2). The crude RCY was marginally lower than crude RCY on EWOD platform (45±10%, n=2), which was mainly due to lower fluorination efficiency compared to that on EWOD platform (93±3%, n=2). After fluorination, the radioactivity would ideally be uniformly distributed through the reaction droplet, but in fact is confined to a smaller region corresponding to the location of the [$^{18}$F]TBAF residue after the initial [$^{18}$F]fluoride drying step. Further optimizations will focus on improving fluorination efficiency by adding external means to facilitate mixing and dissolution processes, and by carefully controlling volume of solution in reaction site.

As expected, after implementation of automated reagent loading and product collection for [$^{18}$F]FDG synthesis, the crude RCY was enhanced to 50±8% (n=4). Higher radioactivity recovery (69±5%, n=4) compared to manual synthesis (49±12%, n=4) dominated the increase of crude RCY. Isolated RCY was 36±6% (n=4). Purification efficiency of the custom cartridge was 72±9% (n=4) and can likely be improved by optimization of the custom purification cartridges and purification process. The synthesis time (up to the end of the collection process) for [$^{18}$F]FDG was ~21 minutes, which is significantly shorter than reported for EWOD-based synthesis (~50 min). Including purification, the synthesis time was ~36 minutes, which only slightly longer than the fastest times reported for macroscale synthesis (~22 min).

The starting activity of [$^{18}$F]fallypride and [$^{18}$F]FDG synthesis was minimized in preliminary experiments for safety reasons to ~0.2-0.4 mCi by loading a 2 μL droplet (radioactivity concentration ~0.1-0.2 mCi/μL). Though sufficient radioactivity was recovered for small animal imaging, it will be desirable in the future to scale this up to enable tracer production for multiple animal studies or for clinical doses. One way to scale up activity is by pre-concentrating the [$^{18}$F]fluoride solution from the cyclotron using a miniaturized anion exchange cartridges. Another approach is to repeatedly load droplets of [$^{18}$F]fluoride solution before drying.

Preliminary experiments were conducted to test the feasibility of the latter approach with manual loading and collecting. To ensure the same ratio of precursor to TBAHCO$_3$ in the fluorination reaction, multiple 2 μL droplets of [$^{18}$F]fluoride/[$^{18}$O]H$_2$O solution (i.e. no TBAHCO$_3$) were first loaded, followed by a single 2 μL, droplet of TBAHCO$_3$ solution (3.6 mM). The mixture was dried at 105° C. for 1 min. In a preliminary experiment, loading of 2, 4, or 8 μL, of [$^{18}$F]fluoride/[$^{18}$O]H$_2$O solution resulted in crude RCYs was 58% (n=1), 54% (n=1), and 50% (n=1). Results are shown in Table 5 below.

TABLE 5

| Parameter | Trial 1 | Trial 2 | Trial 3 | Trial 4 |
|---|---|---|---|---|
| [$^{18}$F]fluoride/[$^{18}$O]H$_2$O solution volume (μL) | 2 | 4 | 6 | 8 |
| Starting radioactivity (mCi) | 0.24 | 0.42 | 0.57 | 0.63 |
| Radioactivity recovery (%) | 83 | 72 | 76 | 79 |
| Fluorination efficiency (%) | 70 | 76 | 57 | 63 |
| Crude RCY (%) | 58 | 55 | 43 | 50 |

This apparent reduction in crude RCY as a function of [$^{18}$F]fluoride/[$^{18}$O]H$_2$O volume could be a mixing issue as it may become increasingly difficult to dissolve the increasing amount of residue in the precursor solution droplet prior to fluorination. Instead of loading a large volume and drying it once, each droplet of [$^{18}$F]fluoride/[$^{18}$O]H$_2$O could be dried after loading, perhaps limiting the lateral extent of the initial residue. For the 8 μL case, the starting activity was 2.34 MBq (~0.63 mCi).

Though the volume capacity of the chip used in the experiments was low (e.g., a few microliters), it is likely that the reagent pathways and reaction region could be scaled up or down to accommodate larger or smaller reaction volumes, respectively. Another way to scale-up is to combine with an auxiliary miniature ion-exchange cartridge, which allows large amounts of radioactive isotope to be concentrated into microliter volumes prior to loading onto the microfluidic chip 10. Thus, a concentrated droplet containing reactants can be used in conjunction with the microfluidic chip 10. This would allow production of sufficient quantities of tracers for clinical PET imaging. In addition to the production of radiotracers for PET, the chip could also be used to make agents for Single-Photon Emission Computed Tomography (SPECT) imaging, labeled peptides/proteins, or radiolabeled therapeutic molecules. It could be used to perform small scale chemical reactions in a variety of other applications as well.

The passive microfluidic device 10 has numerous advantages over EWOD-based devices and other microfluidic approaches. First, microscale radiochemical reactions largely reduce the cost of reagents. Using microliter scale reactions, <1% of the amount of reagents used for macroscale reactions are needed while maintaining similar or higher concentrations. The fabrication of passive chips is much less complicated and much less expensive than EWOD chips or other microfluidic methods for performing chemical reactions. Passive microfluidic chips 10 eliminate the need of extra electronics and pumps to manipulate the fluids on the chip. In addition, the compact size of the passive microfluidic platform requires much less shielding than a traditional macroscale radiosynthesizer. While the latter must be located in a hot cell weighing several tons, the chip can be shielded with the same thickness and potentially be light enough in weight to be used on the benchtop.

While the microfluidic chip 10 described herein has generally been described as containing a single hydrophilic reaction or collection site 16 it should be appreciated that the microfluidic chip 10 may contain multiple hydrophilic reaction or collection sites 16 and associated delivery channels or pathways 18 on a single substrate 12. For example, the multiple hydrophilic reaction or collection sites 16 may be arranged as an array such that parallel or multiple separate synthesis reactions can take place on a single microfluidic chip 10. Such an embodiment, may require a moveable reagent dispenser and/or moveable microfluidic chip 10 (e.g., using a moveable stage or the like) whereby fluids may be loaded and unloaded from the various locations formed on the microfluidic chip.

While embodiments of the present invention have been shown and described, various modifications may be made without departing from the scope of the present invention. The invention, therefore, should not be limited, except to the following claims, and their equivalents.

What is claimed is:

1. A microfluidic synthesis platform comprising:
   a microfluidic chip holder comprising a heating element and a cooling element;
   a microfluidic chip mountable in the microfluidic chip holder, the microfluidic chip comprising a hydrophobic substrate having patterned thereon a hydrophilic reaction site disposed on a central region of the substrate and a plurality of hydrophilic pathways extending outward from the hydrophilic reaction site and terminating at respective loading sites on the substrate, wherein the hydrophilic pathways are tapered with an increasing width in an inward direction from the loading sites to the hydrophilic reaction site; and
   a fixture holding a plurality of reagent dispensing devices disposed above the microfluidic chip at locations corresponding to the loading sites of the plurality of hydrophilic pathways, the fixture further holding a moveable collection tube disposed above the hydrophilic reaction site of the microfluidic chip, the collection tube coupled to a source of vacuum.

2. The microfluidic synthesis platform of claim 1, wherein the plurality of reagent dispensing devices comprise dispensers each coupled to a respective containers containing different reagents.

3. The microfluidic synthesis platform of claim 2, wherein the containers are coupled to a pressurized source of gas.

4. The microfluidic synthesis platform of claim 2, wherein one of the containers contains a radioisotope or prosthetic group.

5. The microfluidic synthesis platform of claim 2, wherein one of the containers contains a precursor solution.

6. The microfluidic synthesis platform of claim 2, wherein the moveable collection tube is mounted to a pneumatic cylinder configured to actuate between first and second positions.

7. The microfluidic synthesis platform of claim 2, wherein each dispenser has a droplet-generating nozzle.

8. The microfluidic synthesis platform of claim 2, wherein the cooling element comprises a Peltier cooling device.

9. The microfluidic synthesis platform of claim 2, wherein the hydrophobic surface defines an upper surface exposed to an external environment, wherein the hydrophilic reaction site and the plurality of hydrophilic pathways are located on the upper surface.

10. The microfluidic synthesis platform of claim 2, further comprising a collection vial interposed between the source of vacuum and the collection tube.

11. A microfluidic synthesis platform for the passive manipulation of droplets comprising:
   a microfluidic chip holder comprising a heating element and a Peltier cooling element;
   a microfluidic chip mountable in the microfluidic chip holder and arranged in a horizontal orientation, the microfluidic chip comprising a hydrophobic substrate having patterned thereon a hydrophilic reaction site disposed on a central region of the substrate and a plurality of hydrophilic pathways extending outward from the hydrophilic reaction site and terminating at respective loading sites on the substrate, wherein the hydrophilic pathways are tapered with an increasing width in an inward direction from the loading sites to the hydrophilic reaction site whereby droplets placed at the loading sites spontaneously move to the reaction site; and
   a fixture holding a plurality of droplet dispensing devices disposed above the microfluidic chip at locations corresponding to the loading sites of the plurality of hydrophilic pathways, the fixture further comprising a moveable collection tube coupled to a source of vacuum and disposed above the hydrophilic reaction site of the microfluidic chip and moveable between an up position away from the microfluidic chip and down position that places an end of the collection tube adjacent to the hydrophilic reaction site.

* * * * *